June 24, 1952 — J. WANDY — 2,601,651
SELF-LOCKING CONNECTING MEANS
Filed July 1, 1948
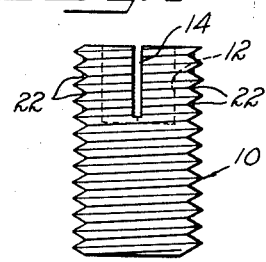
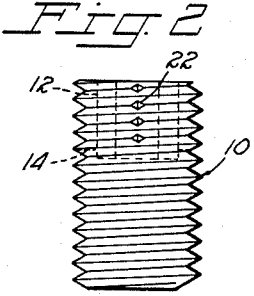
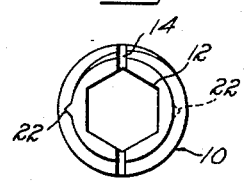
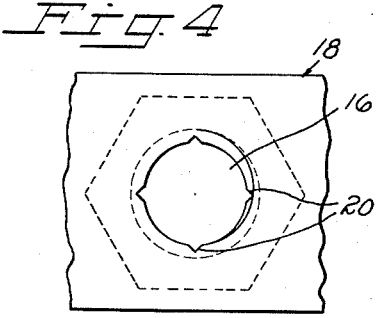
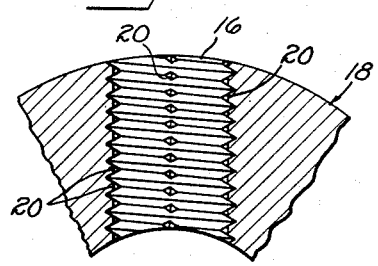
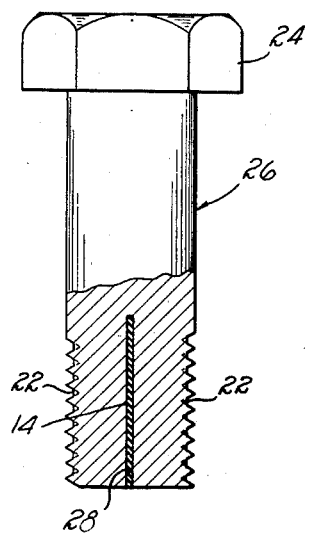
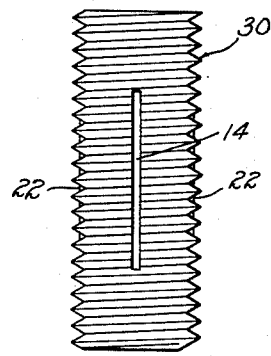
Inventor
JOSEPH WANDY
By Lindsey, Prutzman & Just
Attorneys Patented June 24, 1952

2,601,651

UNITED STATES PATENT OFFICE 2,601,651

SELF-LOCKING CONNECTING MEANS

Joseph Wandy, Hartford, Conn.

Application July 1, 1948, Serial No. 36,532

5 Claims. (Cl. 151—9)

This invention relates to improvements in self-locking connecting means and more particularly to self-locking construction for threaded connecting means such as are commonly used in conjunction with nuts, bolts, and other devices which are secured together threadably.

It is an object of the present invention to provide on members constructed for threaded connection means automatically operative to lock the threads of the members against relative rotation after the threaded members have been connected a predetermined amount. It is an aim of this object of the invention to provide self-locking means which may be added to the several members by inexpensive mass production operations whereby the cost of producing the improved locking means does not materially increase the cost of the finished articles. It is a further aim of this object to provide locking means which will be more efficient and positive in their locking operation than other locking means heretofore used.

Details of this object and of the invention as well as other objects thereof are set forth in the following specification and illustrated in the accompanying drawing comprising a part thereof.

In the drawing:

Fig. 1 is a side elevation of an externally threaded cylindrical member embodying part of the self-locking means comprising the present invention;

Fig. 2 is a view similar to Fig. 1 except that the threaded member is rotated about its axis 90° to the view shown in Fig. 1;

Fig. 3 is a top plan view of the member shown in Figs. 1 and 2;

Fig. 4 is a top plan view of another member adapted to be connected to the member shown in Figs. 1 through 3, this view representing a fragmentary plan view of one form of such member.

Fig. 5 is a sectional vertical elevation of the member shown in full lines in Fig. 4;

Fig. 6 is a side elevation of a headed member having external threads thereon embodying part of the self-locking means comprising the invention and also illustrating a further embodiment of the invention; and Fig. 7 is a side elevation of an externally threaded cylindrical member embodying the present invention and representing a still further embodiment thereof.

Referring to the drawing, and particularly Figs. 1 through 3, a cylindrical externally threaded member 10 is shown in the form of an Allen screw in that said member is provided in its upper end with a socket 12 which is hexagonal in plan view as shown in Fig. 3. The member 10 is provided in a portion of its length with a slot 14 which preferably bisects the central axis of the member. The external threads of member 10 are adapted to engage internal threads formed within an aperture 16 of a second member 18 to which member 10 is to be threadably connected. The member 18 shown fragmentarily in Figs. 4 and 5 is exemplary of a collet or the hub of a wheel or gear. It is to be understood that the herein described member 18 is merely exemplary of one such member. Such a member may also be, for example, any suitable form or shape of internally threaded nut, not shown in the drawings.

The principal feature of the invention comprises, in conjunction with slot 14, the formation of notches 20 in predetermined positions in at least certain convolutions of the thread within the aperture 16 of internally threaded member 18. Such notches may be formed in any suitable manner such as by filing or shaving, and in order to form such notches by the most economical means, the notches are formed in alignment in rows preferably parallel to the axis of the aperture 16. When viewed from the side as shown in Fig. 5, said notches will be somewhat diamond-shaped, whereas in plan view, they are V-shaped in the preferred embodiment, the side surfaces of each notch extending in opposite directions at similar angles to a radial plane longitudinal of the aperture. It should be understood, however, that said notches may have curved sides in plan view if desired or may be of any other suitable shape. For purposes of rendering the invention more useful, the notches 20 are preferably formed in diametrically opposed pairs of rows of such notches as is clearly shown in Figs. 4 and 5, two pairs of such rows of notches being shown in Fig. 4.

The externally threaded member 10 is provided in the root portion of at least one convolution of its thread with a projection 22 which is adapted to be received in one of the notches 20 when juxtaposed thereto when the member 10 is being threadably connnected to member 18. The side surfaces of each projection extend away from the apex thereof at substantially even angles from a longitudinal radial plane through the member 10. In order that the invention may be more effective and capable of wider use, however, a plurality of axially aligned projections 22 are provided in successive convolutions of the thread on member 10, and the line or row of such projections 22 is disposed transversely of the slot 14 so that a radial line extending from said projections would be perpendicular to the plane of said slot. The slot 14 should extend in the member 10 at least as far as the row or rows of projections 22 as is clearly shown in Figs. 1, 2, 6, and 7. Preferably, also, there is provided a pair of diametrically opposed rows of projections 22, as is clearly shown in these figures. In plan view as shown in Fig. 3, the projections 22 are complementary in shape to the plan view of the notches 20 in order to provide efficient locking action between members 10 and 18.

When member 10 is being threaded into member 18, for example, those convolutions of the thread of member 10 which do not contain any of the projections 22 may be freely threaded into the internal threads within aperture 16. However, when the convolutions containing the projections 22 encounter the internal thread within aperture 16, yielding between the projections 22 and the internal thread will be required. Such yielding is afforded by the inherent resilience of member 10 and the slot 14 which permits opposed projections formed on opposite sides of the member 10 to move toward each other in order that such projections may be detented relative to notches 20 and slide relative to the unnotched crest portions of the internal threads within aperture 16.

When the projections encounter notches 20 during the rotation of member 10 relative to member 18, the inherent resilience of the material from which member 10 is formed will permit the deflected opposed portions of member 10 to expand to their normal positions shown in Fig. 1 and thus move at least certain of the projections 22 into certain of the notches 20. Continued rotation of member 10 relative to member 18 will cause the projections 22 to engage unnotched portions of the internal thread and deflect the opposed portions of member 10 on opposite sides of the slot 14. Such opposite portions of the member 10 will remain deflected until the projections 22 next encounter notches 20 in the internal threads within aperture 16 and said projections may then detent into the notches 20. Such functions continue until the member 10 is threaded into member 18 as far as desired.

Although only a single diametrically opposed pair of rows of projections 22 is provided on member 10, certain of the projections 22 on said rows will alternately co-engage the pairs of the two diametrically opposed pairs of rows of notches 20 formed in the thread of aperture 16. The diametrically opposed pairs of rows of notches 20 are preferably at a right angle to each other and the provision of more than one pair of notches will render the self-locking means comprising notches 20 and projections 22 more universal in scope in that the provision of the second pair of diametrically opposed rows of notches 20 will permit locking of the member 10 at each 90° of relative rotation between the members rather than at every 180° of rotation. If desired, a greater number of pairs of rows of notches may be provided to further facilitate the locking function of the notches 20 and projections 22 by less rotation between the members.

Projections 22 may be conveniently and inexpensively formed in the root portions of certain of the convolutions of the thread on member 10 by rolling the thread on member 10 and, for example, providing notches within the crests of the thread forming ridges on the rolls whereby the projections 22 will be formed within the root portions of the convolutions of the thread which are to contain such projections.

While the embodiment of the invention shown in Figs. 1 through 3 illustrates the projections formed on a so-called Allen screw, the locking means comprising the present invention may be applied to other forms of externally threaded members such as an headed bolt or screw 26 shown in Fig. 6, for example, wherein the slot 14 extends inward from the end of the bolt opposite the head 24. It will be noted the slot extends longitudinally of the bolt 26 a greater distance than the length of the row of projections 22 in order that the opposed portions of the bolt on opposite sides of the slot 14 may be deflected toward each other for the purposes described above relative to the projections 22 engaging notches 20 in any suitable member 18 to which the bolt 26 is to be attached. Obviously, too, any other suitable kind of rotating means such as a slot to receive a screwdriver bit may be provided on either member 10 or bolt 26.

The bolt shown in Fig. 6 also illustrates another embodiment of the invention in that, under some circumstances, it may be desirable to fill the slot 14 with any suitable compressible material 28 such as rubber, synthetic resinous material, or the like. The material 28 will serve to prevent extraneous, relatively incompressible material, such as dirt, grit, and the like, from filling said slot during use and thus prevent the locking means 20 and 22 from functioning to their fullest efficiency.

It should also be understood that the externally threaded member need not have the projections 22 provided at one end or the other thereof if certain situations require the locking means comprising the projections to be placed elsewhere on an externally threaded member. As shown in Fig. 7, for example, an externally threaded member 30, which can serve either as a bolt, coupling member, or otherwise, may be provided with a slot 14 intermediate the ends but parallel to the axis thereof; and, in this event, the projections 22 formed in the root portions of certain convolutions of the thread thereof will be provided so that the opposed rows of projections 22 will be disposed transversely opposite the slot 14. For the reasons set forth hereinabove, the rows of projections will be shorter than the slot 14.

Due to the provision of the slots 14 in the several embodiments illustrated and described herein, it will be seen that the externally threaded members are provided with opposed portions which may be deflected toward each other when the projections 22 are detented from engagement with the notches 20 and engage the unnotched portions of the internal thread so that said projections 22 may slide over said unnotched portions in the aperture of any suitable member 18, said opposed deflected portions also providing means for causing the projections 22 to be moved outward from the axis of the externally threaded member so as to be detented into the notches 20 when said notches are juxtaposed to said projections while the relatively movable members are being threadably connected. The inherent resilience of the material from which the externally threaded members are formed will be sufficient to yieldably retain the projections 22 within the notches 20 so as to prevent undesired, relative disengaging movement between the threaded members. However, the locking effect of the notches and projections may be readily overcome when a wrench or other suitable tool is applied to one or the other of said members to effect relative movement therebetween. In view of the oppositely sloping faces of the notches 20 and projections 22, detenting of the projections relative to said notches may take place in either direction of rotation of the threaded members containing the same. Thus, the members may be threadably connected and disconnected numerous times without imparing the locking function of said notches and projections.

While the invention has been illustrated and described in its preferred embodiments and has included certain details, it should be understood that the invention is not to be limited to the precise details herein illustrated and described since the same may be carried out in other ways, falling within the scope of the invention as claimed.

I claim as my invention:

1. Self-locking threaded connecting means comprising in combination, a member having an aperture provided internally with a thread, said thread having a notch intersecting it at a predetermined position, a cylindrical member having an external thread thereon complementary to the internal thread of said member, and a projection disposed at a predetermined position in the root portion of said external thread and having side surfaces sloping in opposite directions away from the apex thereof inward to said root portion of the thread, said projection being disposable within said notch in said internal thread when juxtaposed thereto incident to threadably connecting said members and removable therefrom by relatively rotating said members in either direction, and said cylindrical member being slotted for a portion of its length where said projection is positioned so as to be yieldable and permit said projection to move inward toward the axis of said cylindrical member during the time said projection is engaging the unnotched portions of said internal thread and also urge said projection outward into engagement with said notch when said projection is juxtaposed to said notch.

2. Self-locking threaded connecting means comprising in combination, a member having an aperture provided internally with a thread, said thread having a pair of diametrically opposed notches intersecting one convolution of said thread, a cylindrical member having an external thread thereon complementary to the internal thread of said member, and a pair of diametrically opposed projections disposed in the root portion of one convolution of said external thread and disposable within said notches in said internal thread when juxtaposed thereto incident to threadably connecting said members said projections each having side surfaces sloping in opposite directions away from the apexes thereof inward to the root portions of the threads, whereby said projections are removable from said notches by relatively rotating said members in either direction, and said cylindrical member being slotted for a portion of its length where said projections are positioned so as to be yieldable and permit said projections to move toward each other during the time said projections are engaging the unnotched portions of said internal thread and also urge said projections outward into engagement with said notches when said projections are juxtaposed to said notches.

3. Self-locking threaded connecting means, comprising a member having an aperture provided internally with a thread, said thread having a notch intersecting it at a predetermined position, a cylindrical member having an external thread thereon complementary to the internal thread of said member, a projection disposed at a predetermined position in the root portion of said external thread and disposable within said notch when juxtaposed thereto incident to threadably connecting said members said notch and projection having cooperating surfaces provided with means to permit disengagement thereof, by relatively rotating said members in either direction, and said cylindrical member being slotted for a portion of its length where said projection is positioned so as to be yieldable and permit the projection to move inwardly toward the axis of said cylindrical member during the time said projection is engaging the unnotched portions of said internal thread, and also to urge said projection outwardly into engagement with said notch when said projection is juxtaposed thereto.

4. Self-locking threaded connecting means, comprising a member having a cylindrical aperture provided internally with a thread, said thread having a plurality of axially aligned notches intersecting successive convolutions of said thread, a cylindrical member having an external thread thereon complementary to the internal thread of said member, a plurality of axially aligned projections integrally formed in the root portions of a plurality of successive convolutions of said external thread, said projections being disposable within said notch when juxtaposed thereto incident to threadably connecting said members, each of said notches and projections having cooperating surfaces provided with means to permit disengagement thereof, and said cylindrical member being slotted for a portion of its length where said projections are positioned so as to be yieldable and permit said projections to move inwardly and outwardly with respect to said notches.

5. Self-locking threaded connecting means, comprising a member having an aperture provided internally with a thread, said thread having two pairs of diametrically opposed notches intersecting one convolution of said thread, a cylindrical member having an external thread thereon complementary to the internal thread of said member, a pair of diametrically opposed projections disposed in the root portion of one convolution of said external thread and selectively disposable within one pair of said notches in said internal thread when juxtaposed thereto incident to threadably connecting said member, each of said notches and projections having cooperating surfaces provided with means to permit disengagement thereof, and said cylindrical member being slotted along a portion of its length where said projections are disposed so as to be yieldable and permit said projections to move inwardly and outwardly with respect to said notches.

JOSEPH WANDY.

REFERENCES CITED

The following references are of record in the file of this patent:

UNITED STATES PATENTS

| Number | Name | Date |
|---|---|---|
| 969,537 | Jargick | Sept. 6, 1910 |
| 1,009,909 | Levalley | Nov. 28, 1911 |
| 1,227,310 | Quick | May 22, 1917 |
| 1,434,558 | Merryman | Nov. 7, 1922 |
| 1,874,595 | Olson | Aug. 30, 1932 |
| 1,986,061 | Hill | Jan. 1, 1935 |
| 1,996,727 | Leslie | Apr. 2, 1935 |
| 2,407,160 | Kahn | Sept. 3, 1946 |
| 2,484,644 | Poupitch | Oct. 11, 1949 |

FOREIGN PATENTS

| Number | Country | Date |
|---|---|---|
| 6,667 | Great Britain | A. D. 1893 |
| 19,623 | Great Britain | A. D. 1911 |
| 20,191 | Australia | May 25, 1905 |